United States Patent
Min

(10) Patent No.: US 7,675,892 B2
(45) Date of Patent: Mar. 9, 2010

(54) SUB-ACCESS POINT, SYSTEM, AND METHOD FOR ADJUSTING POWER OF TRANSMISSION SIGNAL

(75) Inventor: In-hong Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 965 days.

(21) Appl. No.: 11/252,738

(22) Filed: Oct. 19, 2005

(65) Prior Publication Data

US 2006/0083206 A1  Apr. 20, 2006

(30) Foreign Application Priority Data

Oct. 19, 2004  (KR) .................... 10-2004-0083589

(51) Int. Cl.
*H04W 4/00* (2006.01)
*H04B 7/15* (2006.01)

(52) U.S. Cl. ..................... 370/338; 455/11.1
(58) Field of Classification Search .............. 455/434, 455/41.2, 522, 436, 11.1; 370/338, 236, 370/331

See application file for complete search history.

(56) References Cited

U.S. PATENT DOCUMENTS

| | | | |
|---|---|---|---|
| 5,450,616 A | 9/1995 | Rom | |
| 6,545,986 B1 * | 4/2003 | Stellakis | 370/318 |
| 2005/0026610 A1 * | 2/2005 | Backes et al. | 455/434 |
| 2005/0122999 A1 * | 6/2005 | Scherzer et al. | 370/480 |
| 2006/0092888 A1 * | 5/2006 | Jeong et al. | 370/338 |

FOREIGN PATENT DOCUMENTS

| | | | |
|---|---|---|---|
| KR | 1999-0031807 A | 5/1999 | |
| KR | 2001-0106347 A | 11/2001 | |
| KR | 10-2004-0031327 A | 4/2004 | |

* cited by examiner

*Primary Examiner*—Kamran Afshar
*Assistant Examiner*—Michael Faragalla
(74) *Attorney, Agent, or Firm*—Sughrue Mion, PLLC

(57) ABSTRACT

A sub-access point (AP), system, and method for adjusting a power level of a transmission signal, and more particularly, in which the power level of a transmission signal output from the sub-AP is adjusted based on received signal strength indicator (RSSI) readings and frame error rate (FER) of a main AP, thereby eliminating shadow areas and minimizing interference between the main AP and the sub-AP. The sub-AP includes a reception unit which receives a beacon frame and a data frame from a main AP, a RSSI checking unit which checks an RSSI of the main AP, a FER checking unit which checks an FER, and a control unit which determines a power level at which a transmission signal is to be transmitted based on the identified RSSI and the identified FER and causes a transmission signal to be output at the determined power level.

12 Claims, 7 Drawing Sheets

SUB-ACCESS POINT, SYSTEM, AND METHOD FOR ADJUSTING POWER OF TRANSMISSION SIGNAL

CROSS-REFERENCE TO RELATED APPLICATION

This application claims priority from Korean Patent Application No. 10-2004-0083589 filed on Oct. 19, 2004 in the Korean Intellectual Property Office, the disclosure of which is incorporated herein by reference in its entirety.

BACKGROUND OF THE INVENTION

1. Field of the Invention

The present invention relates to a sub-access point (AP), system, and method for adjusting the power of a transmission signal, and more particularly, to a sub-AP system and method for adjusting the power of a transmission signal, in which the power of a transmission signal output from the sub-AP is adjusted based on received signal strength indicator (RSSI) readings and a frame error rate (FER) of a main AP, thereby eliminating shadow areas and minimizing the interference between the main AP and the sub-AP.

2. Description of the Related Art

In general, in a wireless local area network (LAN), a home or a predetermined region can be serviced by using a single access point (AP).

In some cases, however, the home or the predetermined region cannot be serviced by using a single AP because of the building structure or topography—a problem which will be described in detail below with reference to FIG. 1.

FIG. 1 is a diagram showing a received signal strength indicator (RSSI) distribution in a case where a conventional AP is installed on a wall of a living room.

Referring to FIG. 1, a wireless LAN AP is generally installed in an area to facilitate efficient wireless communication, e.g., in a living room of an apartment. The beam pattern of an antenna is generally unidirectional, and thus, stable communication can be maintained in the living room.

However, a room adjacent to the living room and shielded by walls may get only a weak signal, if any, transmitted by the AP installed in the living room. Thus, in this adjacent room the data transfer rate may be considerably lower, or communication may be unsuccessful. A room such as this is called a shadow area, which is an area where radio waves can hardly be received because of the building structure or topography.

In other words, as illustrated in FIG. 1, the closer to the AP, the higher the RSSI. Portions of the living room with higher RSSIs are represented by darker shading. However, since in a room other than the living room it is difficult to receive a signal transmitted by the AP, portions of the room are rendered in lighter shading to represent the low RSSI.

In short, shadow areas may be generated in rooms other than the living room. Accordingly, a Voice over Internet Protocol (VoIP) service cannot be provided to such a shadow area.

In order to help solve this problem with shadow areas, and other problems, an additional AP with a lower power than the AP of the living room may be installed in one of the shadow areas, thereby expanding the range of wireless communication for a user.

In this case, however, if the two APs use the same channel, they may interfere with each other, thereby deteriorating the performance of the wireless network. Further, the additional AP is designed to transmit a signal with a fixed power, which may be sometimes higher than what is needed.

In order to reduce interference between the two APs, two different channels may be allocated to the APs. In this situation, however, the entire network capacity decreases especially in a densely populated place, such as an apartment building, because of a shortage of available channels.

Moreover, the additional AP transmits a signal with a fixed power regardless of the location of the AP in the living room. Thus, if a user relocates the AP in the living room, new shadow areas may be generated.

Therefore, it is necessary to develop a system and method which, in the illustrative and non-limiting scenario discussed above, can adjust the transmission power of the additional AP and can minimize interference between the AP installed in the living room and the additional AP, even when the two APs use the same channel.

Korean Patent Laid-Open Publication No. 1999-031807 entitled "Method and Apparatus for Controlling the Transmission Power of Wireless LAN (WLAN) station" discloses a method of controlling the transmission power of a WLAN station which includes: allowing a client station to issue a request to an AP for controlling the transmission power if it receives a low power signal; and allowing the AP to issue a request for switching of transmission power modes to all the stations in a wireless LAN. In this patented method, however, even when the transmission power levels of the stations in the wireless LAN are successfully controlled, it is still very difficult to completely eliminate shadow areas simply by using a single AP.

SUMMARY OF THE INVENTION

The present invention provides a sub-access point (AP), and a system and method for adjusting the power of a transmission signal which can eliminate shadow areas by adjusting the power of a transmission signal output from the sub-AP based on received signal strength indicator (RSSI) readings and frame error rate (FER) of a main AP.

The present invention also provides a sub-AP, and a system and method for adjusting the power of a transmission signal which can minimize interference between the sub-AP and a main AP and, thus, can enhance the performance of a wireless network by adjusting the power of a transmission signal output from the sub-AP.

These and other objects of the present invention will be described in or be apparent from the following description of the illustrative, non-limiting embodiments.

Consistent with an aspect of the present invention, there is provided a sub-access point (AP) which adjusts the power of a transmission signal, the sub-AP including: a reception unit which receives a beacon frame and a data frame from a main AP, a received signal strength indicator (RSSI) checking unit which identifies an RSSI of the main AP with reference to the received beacon frame or the received data frame, a frame error rate (FER) checking unit which identifies an FER from the received data frame, and a control unit which determines a transmission level at which a transmission signal is to be transmitted based on the determined RSSI and the determined FER and causes a transmission signal to be output with a power level equivalent to the determined transmission level.

Consistent with another aspect of the present invention, there is provided a system for adjusting the power level of a transmission signal, the system including: a main AP which outputs a beacon frame or a data frame to wirelessly communicate with a plurality of wireless network devices in a wireless network, and a sub-AP which receives the beacon frame or the data frame output from the main AP, calculates a median RSSI and a median FER of the main AP based on the received beacon frame or the received data frame, and outputs a transmission signal with a power level corresponding to the calculated median RSSI and the calculated median FER.

Consistent with still another aspect of the present invention, there is provided a method of adjusting a power level of a transmission signal, the method including: receiving a data frame transmitted by a main AP, determining an RSSI and FER of the main AP with reference to the received data frame, calculating a median RSSI and a median FER based on the determined results, determining a transmission level based on the calculated median RSSI and the calculated median FER, and outputting a transmission signal with a power level equivalent to the determined transmission level.

BRIEF DESCRIPTION OF THE DRAWINGS

The above and other features and advantages of the present invention will become more apparent by describing in detail illustrative, non-limiting embodiments thereof with reference to the attached drawings in which.

DETAILED DESCRIPTION OF ILLUSTRATIVE, NON-LIMITING EMBODIMENTS OF THE INVENTION

Figure 1:
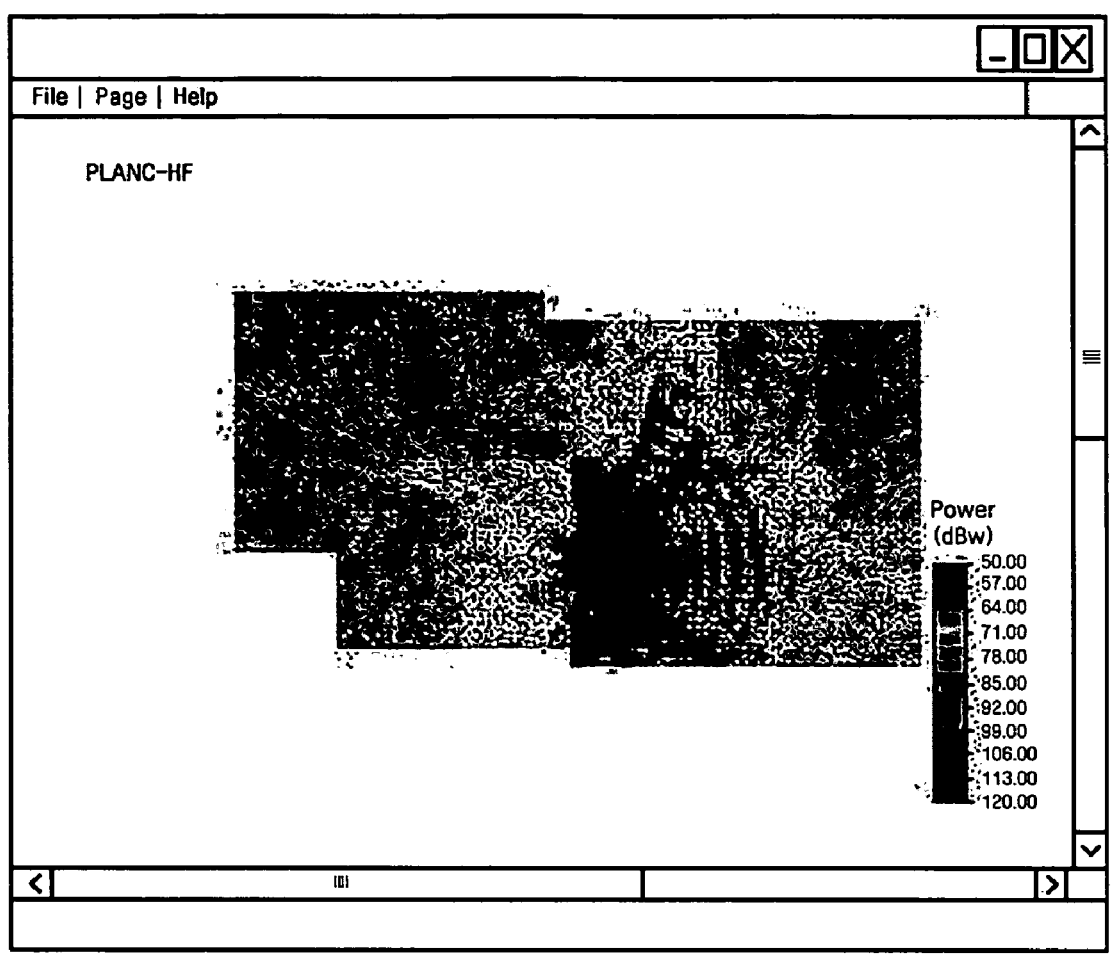
FIG. 1 is a diagram presenting a received signal strength indicator distribution in a case where a conventional AP is installed on a wall of a living room.

Advantages and features of the present invention and methods of accomplishing the same may be understood more readily by reference to the following detailed description of illustrative, non-limiting embodiments and the accompanying drawings. The present invention may, however, be embodied in many different forms and should not be construed as being limited to the embodiments set forth herein. Rather, these exemplary embodiments are provided so that this disclosure will be thorough, complete, and will fully convey the concept of the present invention to those skilled in the art, and the present invention will only be defined by the appended claims. Like reference numerals refer to like elements throughout the specification.

The present invention will now be described more fully with reference to the accompanying drawings, in which illustrative, non-limiting embodiments of the invention are shown.

Figure 2:
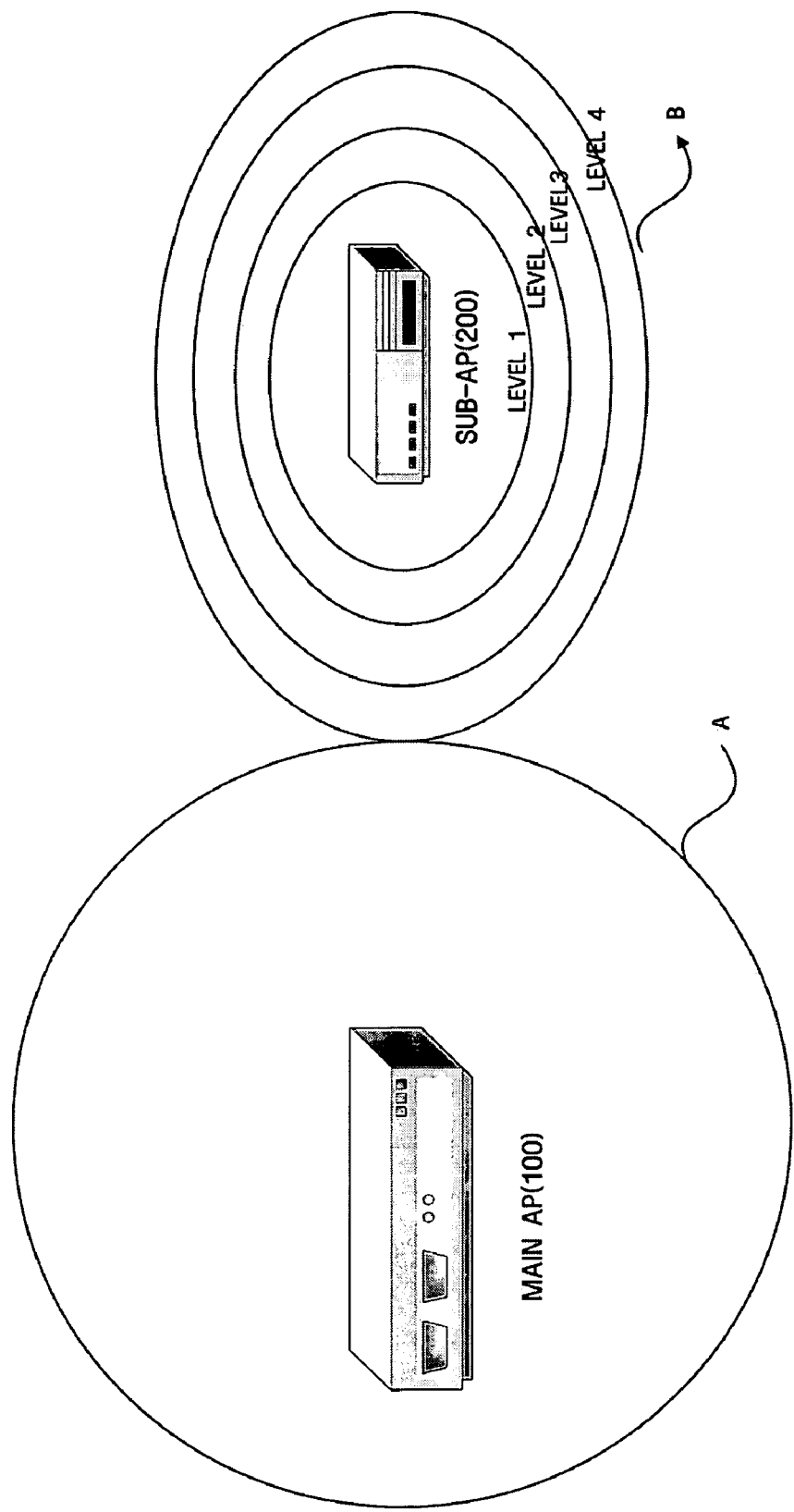
FIG. 2 is a schematic diagram of a system for adjusting the power of a transmission signal consistent with an exemplary embodiment of the present invention.

FIG. 2 is a schematic diagram of a system for adjusting the power of a transmission signal consistent with an exemplary embodiment of the present invention.

Referring to FIG. 2, the system includes a main access point (AP) 100 and a sub-AP 200.

The main AP 100 and the sub-AP 200 use the same channel and have the same service set identifier (SSID). Consistent with the example shown in FIG. 2, the channel and the SSID shared by the main AP 100 and the sub-AP 200 may be set manually by a user or set automatically by a predetermined device used for setting a channel or an SSID.

The main AP 100 outputs a transmission signal for wireless communication to a plurality of wireless network devices in a wireless network environment, and transmits a beacon frame and a data frame to the wireless network devices. In addition, the main AP 100 offers services to a plurality of wireless network devices existing in a region A by transmitting a transmission signal to enable the wireless network devices in the region A to communicate with one another.

The sub-AP 200 determines an RSSI value and a frame error rate (FER) of the main AP 100 based on the beacon frame or the data frame transmitted from the main AP 100, and calculates a median RSSI value and a median FER using the determined RSSI value and FER of the main AP 100. Then, the sub-AP 200 outputs a transmission signal with a power level corresponding to the calculated RSSI value and the calculated FER. In this case, the power level of the transmission signal is controlled so that the overlap of region A with region B is minimized. As shown in FIG. 2, the region A corresponds to the range of the main AP 100 and region B corresponds to the range of the sub-AP 200.

According to the exemplary embodiment shown in FIG. 1, the main AP 100 and the sub-AP 200 use the same channel. Thus, if the area of region A significantly overlaps region B, transmission signals output from the main AP 100 and the sub-AP 200 are more likely to interfere with each other, thus deteriorating the performance of the wireless network.

Therefore, the probability of a transmission signal output from the sub-AP 200 being interfered with by a transmission signal output from the main AP 100 can be minimized by adjusting the power level of the transmission signal output from the sub-AP 200 so as to minimize the area of region A that overlaps region B.

Specifically, the power level of the transmission signal output from the sub-AP 200 is determined based on the power level of the transmission signal output from the main AP 100 (i.e., a median RSSI and a median FER of the transmission signal output from the main AP 100), and the sub-AP 200 sets the power level of the transmission signal output from the sub-AP 200 according to this level.

The power level of the transmission signal output from the main AP 100 can be determined from the RSSI and FER of the main AP 100; that is, the power level at which a transmission signal output from the sub-AP 200 is to be transmitted is determined according to the RSSI value and FER of the main AP 100. In the present illustrative, non-limiting embodiment, the determined transmission level may be classified as one of Level 1, Level 2, Level 3 or Level 4.

Figure 3:
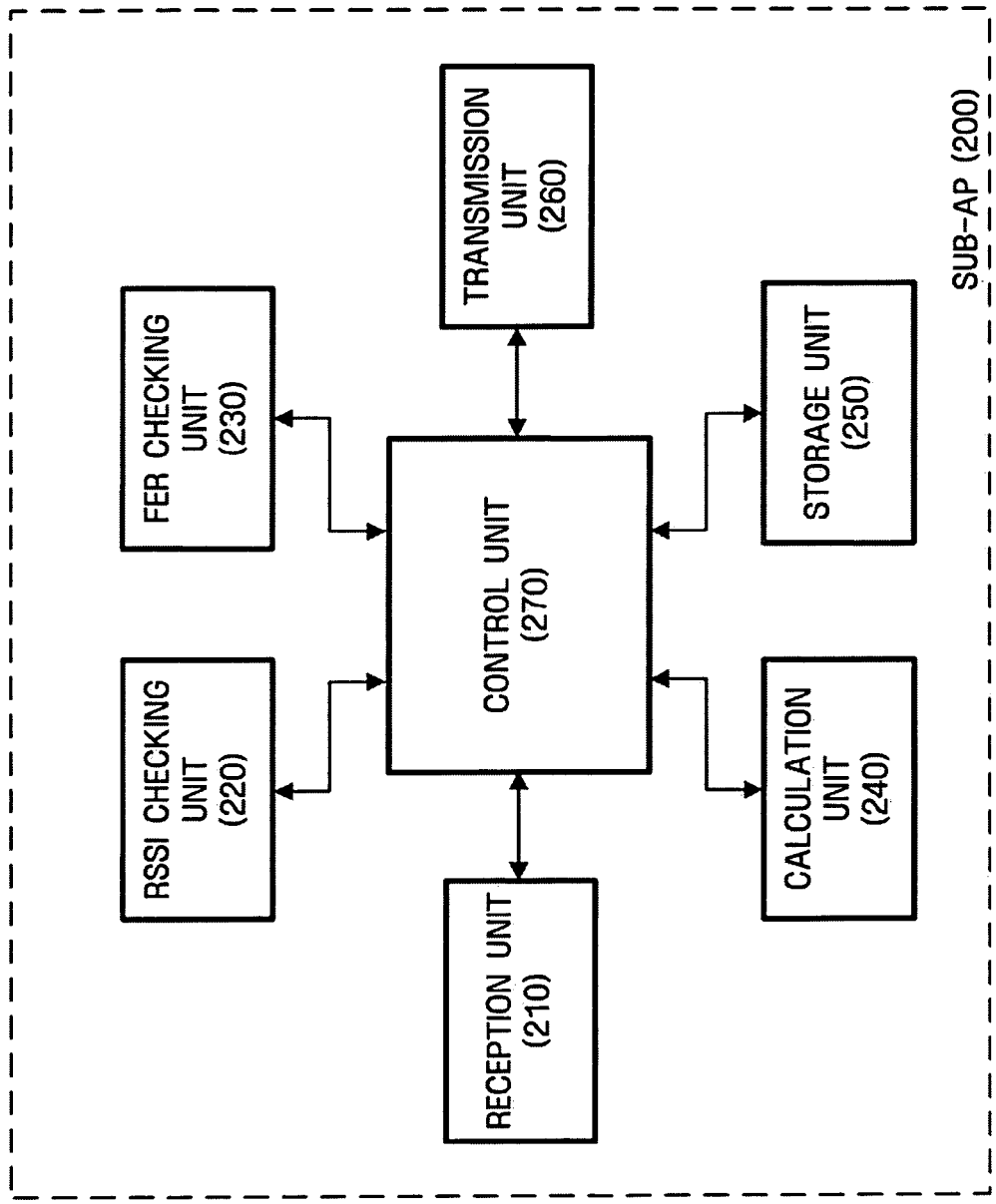
FIG. 3 is a detailed block diagram of a sub-AP for adjusting the power of a transmission signal consistent with an exemplary embodiment of the present invention.

The structure and operation of an illustrative, non-limiting embodiment of the sub-AP 200 will now be described in further detail with reference to FIG. 3. FIG. 3 is a detailed block diagram of the sub-AP 200 of FIG. 2, which adjusts the power level of a transmission signal.

Referring to FIG. 3, the sub-AP 200 includes a reception unit 210, an RSSI checking unit 220, an FER checking unit 230, a calculation unit 240, a storage unit 250, a transmission unit 260, and a control unit 270.

The reception unit 210 receives a beacon frame and a data frame transmitted by the main AP 100.

The RSSI checking unit 220 checks an RSSI value of the main AP 100 with reference to the beacon frame or the data frame received by the reception unit 210. The RSSI value indicates the strength of a received signal. The greater the RSSI value, the stronger the received signal.

The FER checking unit 230 identifies the FER of the main AP 100 with reference to the beacon frame or the data frame received by the reception unit 210. The FER of the main AP 100 may be determined using a request-to-send (RTS) frame and a clear-to-send (CTS) frame.

For example, the main AP 100, which has a data frame to transmit, may transmit an RTS frame to a plurality of wireless network devices, thereby making reservations for a wireless link via which a data frame is to be transmitted and preventing the wireless network devices from generating radio waves.

After receiving an RTS frame transmitted from the main AP 100, the sub-AP 200 identifies that the main AP 100 is about to transmit a data frame to the sub-AP 200 and responds by sending a CTS to the main AP 100. Then the wireless network devices, except the main AP 100 that receives the CTS frame from the sub-AP 200, stop generating radio waves.

Therefore, the main AP 100 and the sub-AP 200 are able to transmit/receive data frames to/from each other. If the main AP 100 and the sub-AP 200 have successfully transmitted/received data frames to/from each other, the number of times the main AP 100 has transmitted an RTS frame to/from the sub-AP 200 may be identical to the number of times the sub-AP 200 has received a CTS frame from the sub-AP 200 and identical to the number of data frames that have been exchanged between the main AP 100 and the sub-AP 200.

The FER checking unit 230 identifies the FER of the main AP 100 and the sub-AP 200 by examining the number of times an RTS frame or a CTS frame has been exchanged between the main AP 100 and the sub-AP 200.

The calculation unit 240 calculates a median RSSI and a median FER based on the RSSI value identified by the RSSI checking unit 220 and the FER identified by the FER checking unit 230.

In this exemplary embodiment, the median RSSI is the median of a plurality of RSSI values arranged in an ascending or descending order, and the median FER is the median of a plurality of FERs arranged in an ascending or descending order.

For example, the median of 1, 2, 5, 6, and 7 is 5. If there is an odd number of data values, the median of the data values is the middle value. On the other hand, if there is an even number of data values, the median of the data values is the average of the middle data values.

The median RSSI and the median FER are calculated using Equations (1) and (2), respectively:

$$RSSI(i, j) = \text{Median} \left( \sum_{t=1}^{n} \right) RSSI(t)) \quad (1)$$

$$FER(i, j) = \text{Median} \left( \sum_{t=1}^{n} \right) FER(t)) \quad (2)$$

wherein i and j represent a location, and t represents time.

In other words, a plurality of RSSI values identified for a predetermined period of time are arranged, and the median of the RSSI values is determined. In addition, a plurality of FERs determined for the predetermined period of time are arranged, and the median of the FERs is determined. Consistent with this illustrative, non-limiting embodiment, the predetermined period of time may be arbitrarily set by a user or the sub-AP 200, and the number of RSSI values or FERs determined for the predetermined period of time may vary according to the data frame reception speed of the sub-AP 200.

The storage unit 250 stores a plurality of RSSI ranges, a plurality of FER ranges, a plurality of transmission levels corresponding to the respective RSSI ranges and the respective FER ranges, and a plurality of power levels equivalent to the respective transmission levels. Consistent with this exemplary embodiment, the transmission levels may be Level 1, Level 2, Level 3, or Level 4. Level 1 is the lowest power level, and Level 4 is the highest power level.

In addition, the storage unit 250 stores an SSID of the sub-AP 200. The SSID is a series of characters identifying a service set of the sub-AP 200. A plurality of wireless network devices in a wireless network have the same SSID and can receive data frames with the same SSID attached thereto.

In other words, the storage unit 250 may store a plurality of RSSI ranges, a plurality of FER ranges, a plurality of transmission levels corresponding to the respective RSSI ranges and the respective FER ranges, and a plurality of power levels depending upon the transmission levels, as shown below in Table 1. However, the power levels stored in the storage unit 250 may be set to, but are not limited to, 0 dBm, 3 dBm, 10 dBm, and 14 dBm, as shown in Table 1. The power levels may be set by a user or a server AP in a different manner.

TABLE 1

Transmission Power Levels and RSSI/FER ranges of Sub-AP

| Transmission Power of Sub-AP | SSID | RSSI | FER |
|---|---|---|---|
| Level 1<br>0 dBm | Same | −70 dBm or higher | 50% or higher |
| Level 2<br>3 dBm | Same | −70 dBm~−80 dBm | 50%~40% |
| Level 2<br>10 dBm | Same | −80 dBm~−85 dBm | 40%~20% |
| Level 4<br>14 dBm | Same | −85 dBm or lower | 20% or lower |

The transmission unit 260 outputs a transmission signal with a predefined power equivalent to one of the transmission levels stored in the storage unit 250.

In particular, the control unit 270 searches the storage unit 250 for a transmission level corresponding to the median RSSI value and the median FER calculated by the calculation unit 240, and transmits a predefined power equivalent to the searched transmission level to the transmission unit 260. Then, the transmission unit 260 outputs a transmission signal with the predefined power.

In addition, the control unit 270 determines whether the median RSSI value and the median FER calculated by the calculation unit 240 correspond to the same transmission level and a transmission level is determined based on the results.

For example, if the calculated median RSSI and the median FER correspond to different transmission levels, the control unit 270 may choose the transmission level that corresponds to the calculated median RSSI. For instance, if the calculated median RSSI value corresponds to Level 1 and the calculated median FER corresponds to Level 3, the control unit 270 chooses Level 1 as a transmission level for the signal that is output from the transmission unit 260.

In addition, the control unit 270 examines an SSID included in the beacon frame or the data frame received by the reception unit 210 in order to determine whether the received beacon or data frame has been transmitted by the main AP 100 or another wireless network device belonging to the same wireless network as the sub-AP 200.

The control unit 270 controls the RSSI checking unit 220 and the FER checking unit 230 to determine an RSSI and an FER, respectively, for a specific period of time, after receiving the beacon frame or the data frame (received by the reception unit 210), and it controls the calculation unit 240 to calculate the median of a plurality of RSSI values identified by the RSSI checking unit 220 and the median of a plurality of FERs identified by the FER checking unit 230.

Figure 4:
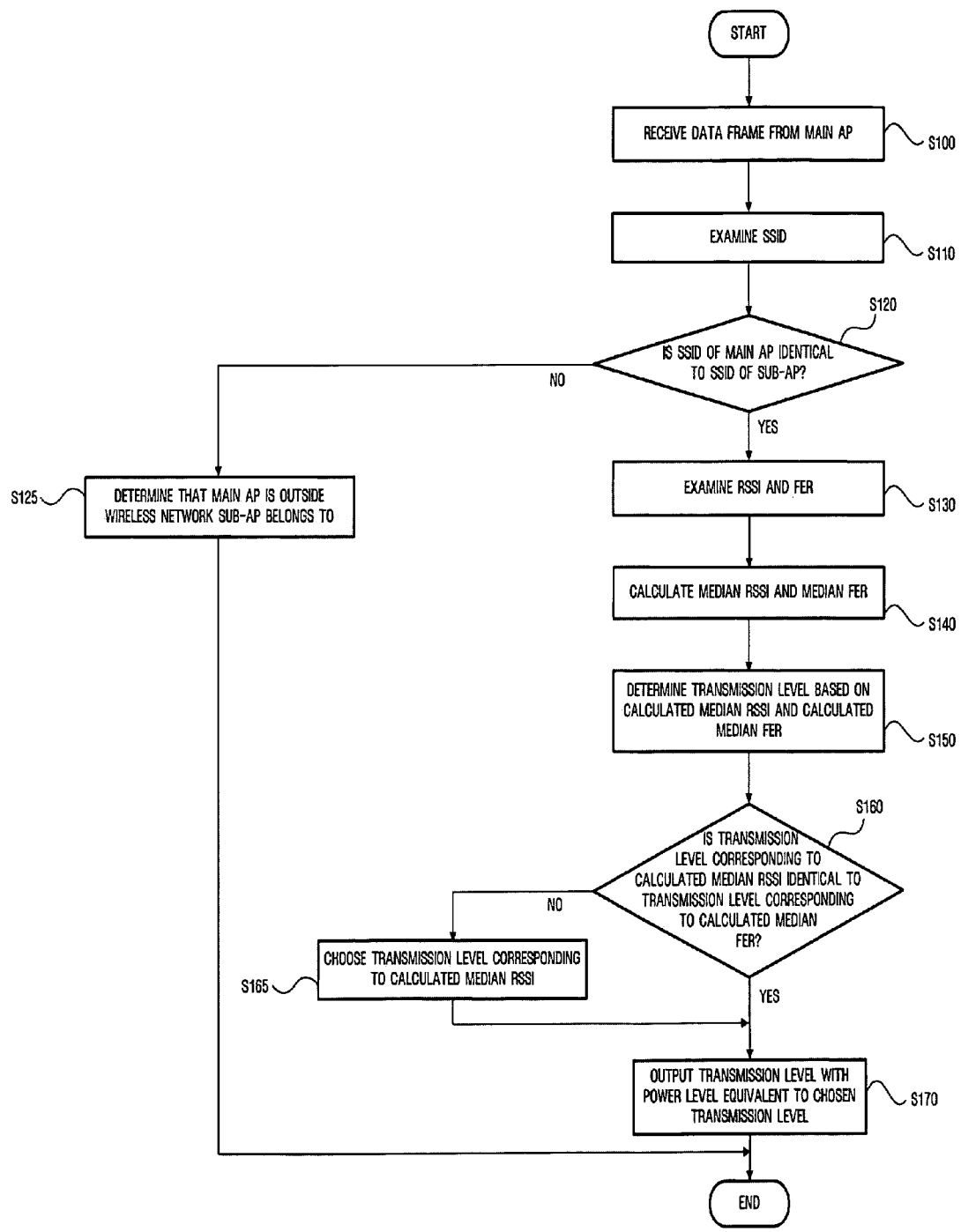
FIG. 4 is a flowchart illustrating a method of adjusting the power of a transmission signal consistent with an exemplary embodiment of the present invention.

FIG. 4 is a flowchart illustrating a method of adjusting the power of a transmission signal consistent with an exemplary embodiment of the present invention. As described above with reference to FIGS. 1 and 2, as shown in FIG. 4, the main AP 100 and the sub-AP 200 use the same channel and share the same SSID. The main AP 100 may transmit both a beacon frame and a data frame to the sub-AP 200. In the present illustrative, non-limiting embodiment of the invention, however, it is assumed that the main AP 100 transmits a data frame to the sub-AP 200.

Referring to FIGS. 1, 2, and 4, in operation S100, the reception unit 210 of the sub-AP 200 receives a data frame transmitted by the main AP 100. In operation S110, the control unit 270 examines an SSID included in the received data frame to determine whether the main AP 100 belongs to the same wireless network as the sub-AP 200.

In operation S130, if the examined results indicate that the SSID of the main AP 100 is identical to the SSID of the sub-AP 200, the control unit 270 controls the RSSI checking unit 220 and the FER checking unit 230, respectively, to determine an RSSI and FER of the main AP 100. The RSSI checking unit 220 may determine the RSSI of the main AP 100 with reference to the received data frame, and the FER checking unit 230 may determine the FER of the main AP 100 with reference to an RTS or CTS frame transmitted between the main AP 100 and the sub-AP 200.

For example, when the main AP 100 transmits an RTS frame to the sub-AP 200, the sub-AP 200 receives the RTS frame and transmits a CTS frame to the main AP 100 in return, and wireless network devices other than the main AP 100 are prevented from generating radio waves.

Thereafter, the main AP 100 can transmit a data frame to the sub-AP 200, and the sub-AP 200 can receive the data frame transmitted by the main AP 100. The number of data frames that have been transmitted between the main AP 100 and the sub-AP 200 is identical to the number of RTS or CTS frames that have been transmitted between the main AP 100 and the sub-AP 200.

Accordingly, the FER checking unit 230 may determine the FER of the main AP 100 based on the number of RTS or CTS frames and the number of data frames that have been transmitted between the main AP 100 and the sub-AP 200.

In operation S140, the control unit 240 calculates the median of a plurality of RSSI values identified by the RSSI checking unit 220 and the median of a plurality of FERs identified by the FER checking unit 230 by arranging the identified RSSI values and the identified FERs in a descending or ascending order.

In operation S150, the control unit 270 determines the transmission level corresponding to the median RSSI value and the transmission level corresponding to the median FER calculated by the calculation unit 240 by referencing a plurality of RSSI ranges and a plurality of FER ranges stored in the storage unit 250 as described above with reference to Table 1.

In particular, the control unit 270 determines to which of the RSSI ranges stored in the storage unit 250 the median RSSI value calculated by the calculation unit 240 belongs, and to which of the FER ranges stored in the storage unit 250 the median FER calculated by the calculation unit 240 belongs, and then identifies the transmission level corresponding to the identified RSSI range and the transmission level corresponding to the identified FER range.

In operation S160, the control unit 270 determines whether the transmission level corresponding to the calculated median RSSI value is identical to the transmission level corresponding to the calculated median FER.

For example, if the calculated median RSSI value is −60 dBm and the calculated median FER is 50%, then the calculated median RSSI value and the calculated median FER are classified as belonging to the same transmission level, i.e., Level 1, and thus, the control unit 270 may choose Level 1 as a transmission level for the sub-AP 200.

However, if the calculated median RSSI value is −75 dBm and the calculated median FER is 50%, then the calculated median RSSI value and the calculated median FER are classified as belonging to different transmission levels, i.e., Level 2 and Level 1, respectively.

If the calculated median RSSI value and the calculated median FER are determined in operation S160 to belong to the same transmission level, then in operation S170 the control unit 270 outputs via the transmission unit 260 a signal with a power level equivalent to the transmission level corresponding to both the calculated median RSSI value and the calculated medina FER.

However, if the calculated median RSSI value and the calculated median FER are determined in operation S160 not to belong to the same transmission level, then in operation S170 the control unit 270 chooses the transmission level corresponding to the calculated median RSSI value in operation S165 and outputs, via the transmission unit 260, a signal with a power level equivalent to the transmission level chosen in operation S1165.

For example, if the sub-AP 200 and the main AP 100 share the same SSID, the calculated median RSSI value is not less than −70 dBm, and the calculated median FER is not lower than 50%, then the control unit 270 chooses Level 1 as the transmission level for the sub-AP 200. Level 1 is equivalent to a power level of 0 dBm.

If the sub-AP 200 and the main AP 100 share the same SSID, the calculated median RSSI value belongs to a range of −70 dBm to −80 dBm, and the calculated median FER belongs to a range of 40% to 50%, then the control unit 270 chooses Level 2 as a transmission level for the sub-AP 200. Level 2 is equivalent to a power level of 3 dBm.

If the sub-AP 200 and the main AP 100 share the same SSID, the calculated median RSSI value belongs to a range of −80 dBm to −85 dBm, and the calculated median FER belongs to a range of 20% to 40%, then the control unit 270 chooses Level 3 as a transmission level for the sub-AP 200. Level 3 is equivalent to a power level of 10 dBm.

If the sub-AP 200 and the main AP 100 share the same SSID, the calculated median RSSI value is not greater than −85 dBm, and the calculated median FER is not higher than 20%, then the control unit 270 chooses Level 4 as a transmission level for the sub-AP 200. Level 4 is equivalent to a power level of 14 dBm.

If the control unit 270 chooses Level 4 as a transmission level for the sub-AP 200, that is to say, if the sub-AP 200 is far from the main AP 100 or located in a shadow area, the sub-AP 200 receives only a weak signal from the main AP 100.

Therefore, the sub-AP 200 outputs a signal with the highest power level—Level 4.

If the main AP 100 and the sub-AP 200 are determined not to share the same SSID in operation S120, then in operation S125 the control unit 270 determines that the received data frame has been transmitted by an AP or a wireless network device outside the wireless network that the sub-AP 200 belongs to and decides not to determine an RSSI and FER for the received data frame.

In short, in the exemplary embodiment discussed above, the power level of the signal output from the sub-AP 200 is adjusted according to a median RSSI value of the main AP 100 and a median FER determined from a data frame transmitted by the main AP 100.

Therefore, it is possible to eliminate shadow areas and to minimize interference occurring between the main AP 100 and the sub-AP 200 due to use of the same channel, by adjusting the power level of the transmission signal output from the sub-AP 200 according to the median RSSI value of the main AP 100 and the median FER determined from a data frame transmitted by the main AP 100.

In addition, it is possible to prevent shadow areas when the location of the main AP 100 is changed by adjusting the power level of a transmission signal output from the sub-AP 200 while minimizing the probability that the main AP 100 and the sub-AP 200 will interfere with each other.

Figure 5A:
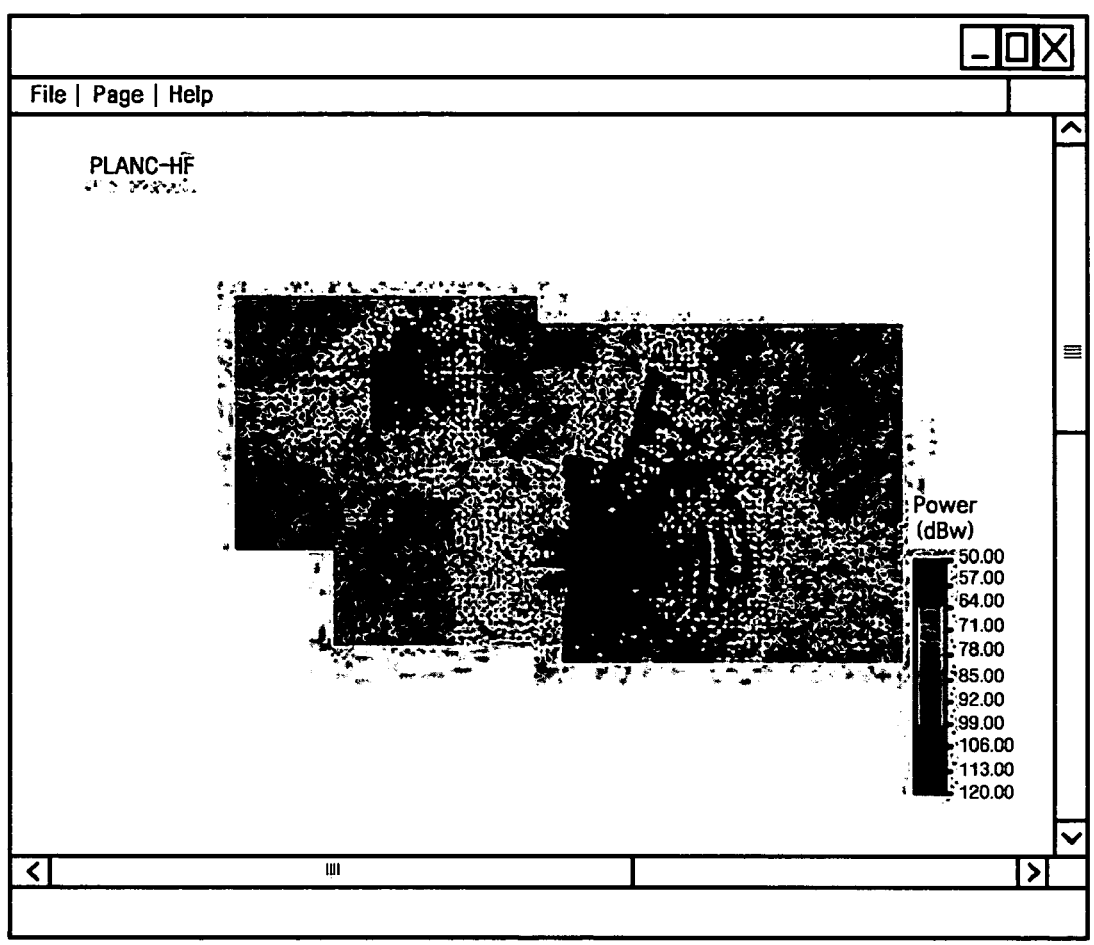
FIGS. 5A, 5B and 5C are diagrams illustrating RSSI simulation results obtained by using a method of adjusting the power of a transmission signal consistent with an exemplary embodiment of the present invention.
Figure 5B:
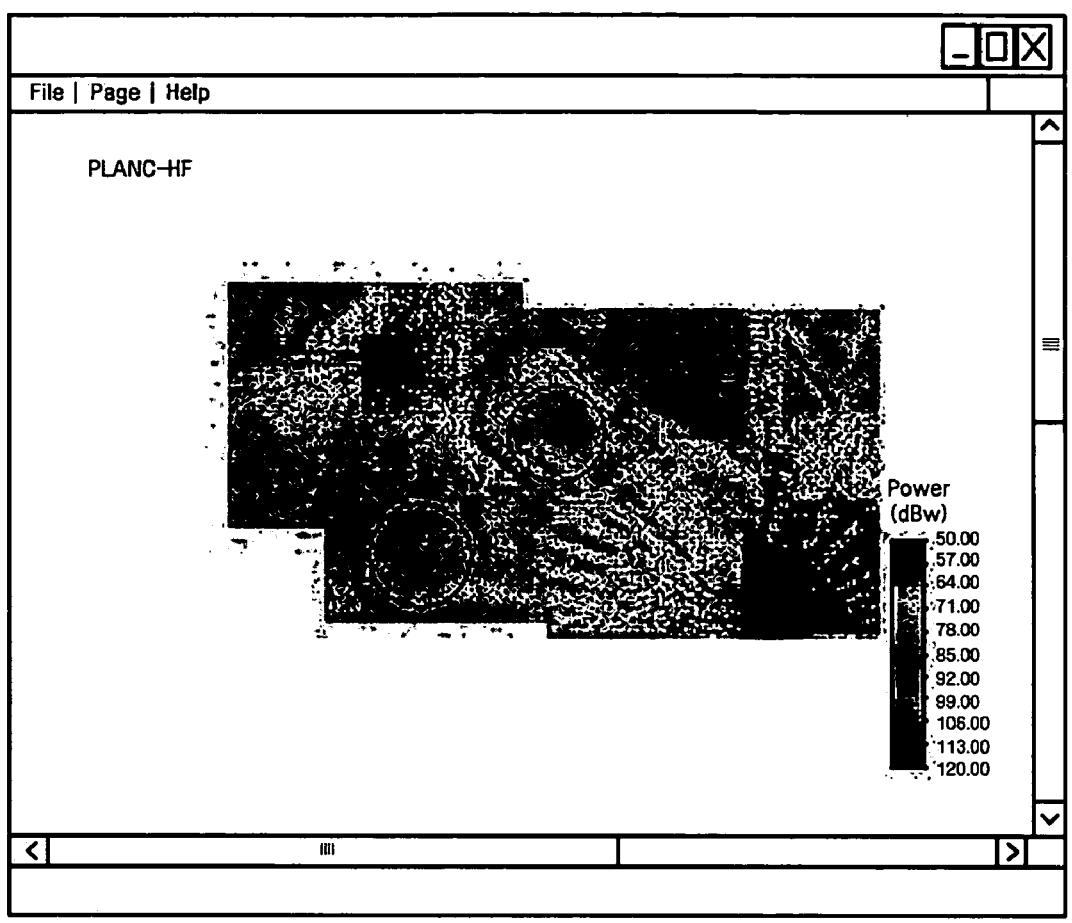
Figure 5C:
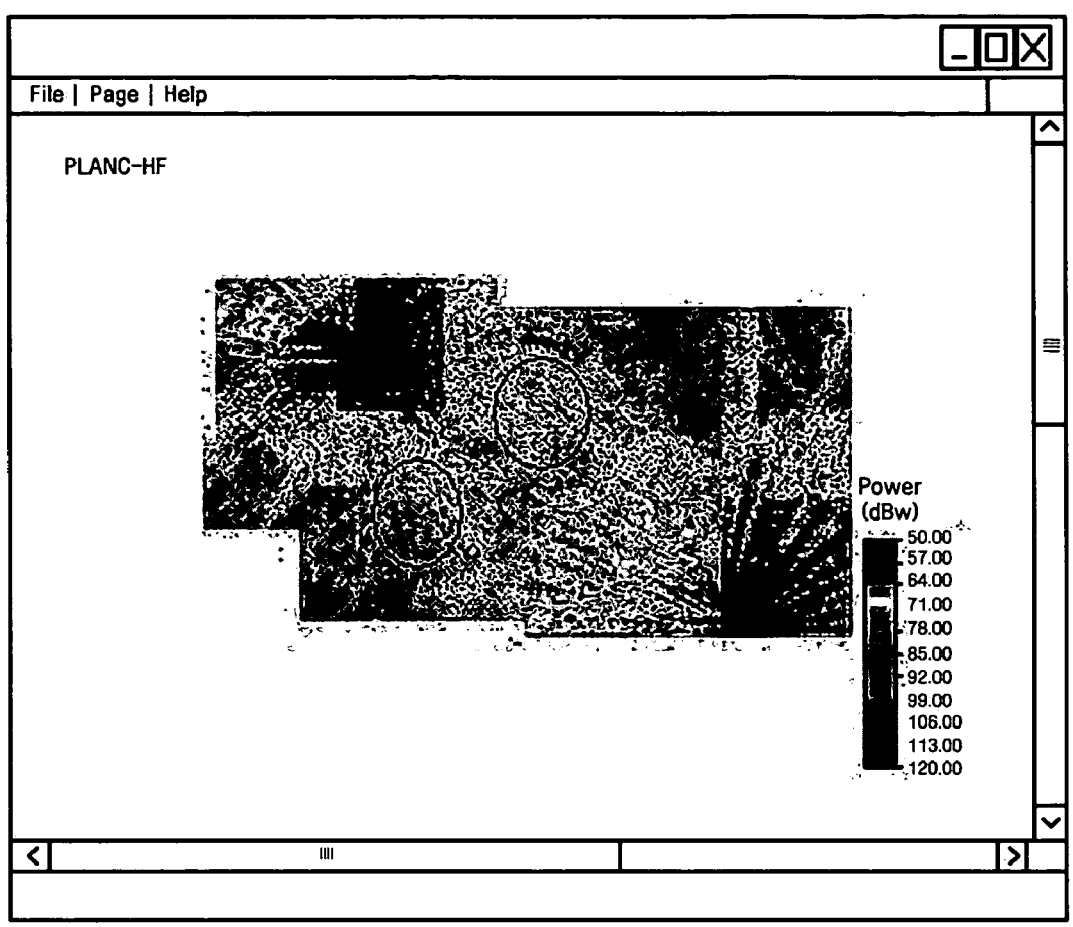

FIGS. 5A through 5C are diagrams illustrating RSSI simulation results obtained by using a method of adjusting the power level of a transmission signal consistent with an exemplary embodiment of the present invention.

In particular, FIG. 5A illustrates RSSI simulation results obtained when a sub-AP is installed in a shadow area, FIG. 5B illustrates RSSI simulation results obtained when the location of a main AP is changed, and FIG. 5C illustrates RSSI simulation results obtained when the sub-AP adjusts the power level of a transmission signal based on the change in the location of the main AP.

Referring to FIG. 5A, since the entire space of a predetermined room cannot be serviced by a single main AP, a sub-AP is installed in a shadow area of the predetermined room so that almost the entire shadow area can be eliminated.

For example, the main AP may be installed on a wall of a living room and the sub-AP may be installed in a shadow area of the living room. FIG. 5A illustrates the RSSI distribution in the predetermined room where the main AP and the sub-AP are installed. The closer to the main AP or sub-AP, the higher the RSSI. Areas of a predetermined region may be represented by darker or lighter shading according to the RSSI of the area. In particular, an area with a higher RSSI is rendered with darker shading, whereas an area with a lower RSSI is rendered lighter shading.

Referring to FIG. 5B, when the main AP is relocated from the position illustrated in FIG. 5A, new shadow areas, which are enclosed by black circles, are generated. In other words, when the main AP is relocated from a first location to a second location, a predetermined area near the first location becomes a shadow area, and thus, its shading is changed from darker to lighter because of a weaker RSSI. If the sub-AP outputs a transmission signal with a fixed power level, it cannot eliminate the shadow areas.

Referring to FIG. 5C, if the sub-AP is able to adjust the power level of a transmission signal according to the location of the main AP 100, it can eliminate the shadow areas, as illustrated in FIG. 5B, by increasing its power and outputting a transmission signal at the increased power.

Therefore, as illustrated in FIG. 5C, the shading of the shadow areas is changed to darker shading because of a strengthening RSSI. In short, it is possible to completely eliminate shadow areas by adjusting the power of a transmission signal output from the sub-AP according to the location of the main AP.

In general, the location and transmission power of the main AP are fixed, and thus, there is no need to frequently adjust the power of a transmission signal output from the sub-AP. Accordingly, the adjustment of the power of a transmission signal output from the sub-AP would not cause too much load.

As described above, consistent with the present invention, it is possible to eliminate shadow areas by adjusting the power of a transmission signal output from a sub-AP based on a median RSSI value of a main AP and a median FER determined from a data frame transmitted by the main AP.

In addition, it is possible to minimize interference between the main AP and the sub-AP when the main AP and the sub-AP use the same channel, and thus, it is possible to enhance the performance of a wireless network.

Moreover, it is possible to eliminate shadow areas generated whenever the location of the main AP changes by adjusting the power of a transmission signal output from the sub-AP while minimizing interference between the main AP and the sub-AP.

Furthermore, since in the present invention the main AP and the sub-AP use the same channel, it is possible to reduce handoff delay by reducing the time required for searching for a channel in a handoff operation Although the present invention has been described in connection with exemplary embodiments of the present invention, it will be apparent to those skilled in the art that various modifications and changes may be made thereto without departing from the scope and spirit of the invention. Therefore, it should be understood that the above embodiments are not limitative, but are illustrative in all aspects.

What is claimed is:

1. A sub-access point (AP) which adjusts the power of a transmission signal, the sub-AP comprising:
   - a reception unit which receives a beacon frame and a data frame from a main AP;
   - a received signal strength indicator (RSSI) checking unit which identifies an RSSI of the main AP with reference to the received beacon frame or the received data frame;
   - a frame error rate (FER) checking unit which identifies an FER from the received data frame;
   - a calculation unit which calculates a median RSSI and a median FER of the main AP; and
   - a control unit which determines a transmission level at which a transmission signal is to be transmitted based on the median RSSI and the median FER, and which causes a transmission signal to be output with a power level equivalent to the determined transmission level,
   - wherein the control unit examines a service set identifier (SSID) of the main AP with reference to the received beacon frame or the received data frame, and
   - the RSSI checking unit, the FER checking unit, the calculation unit, and the control unit operate only if the control unit determines, based on the examination, that the SSID of the main AP is the same as a SSID of the sub-AP.

2. The sub-AP of claim 1, further comprising:
   - a storage unit which stores a plurality of RSSI ranges, a plurality of FER ranges, a plurality of transmission levels corresponding to the respective RSSI ranges and the respective FER ranges, and a plurality of power levels corresponding to the respective transmission levels; and
   - a transmission unit which outputs a transmission signal with a power level corresponding to at least one of the median RSSI and the median FER calculated by the calculation unit.

3. The sub-AP of claim 2, wherein the calculation unit calculates the median RSSI using the equation:

$$RSSI(i, j) = \text{Median} \left( \sum_{t=1}^{n} \right) RSSI(t))$$

wherein i and j represent a location, and t represents time.

4. The sub-AP of claim 2, wherein the calculation unit calculates the median FER using the equation:

$$FER(i, j) = \text{Median} \left( \sum_{t=1}^{n} \right) FER(t))$$

wherein i and j represent a location, and t represents time.

5. A system for adjusting the power level of a transmission signal comprising:
 a main AP which outputs at least one of a beacon frame and a data frame to wirelessly communicate with a plurality of wireless network devices in a wireless network; and
 a sub-AP which receives at least one of the beacon frame and the data frame output from the main AP, calculates a median received signal strength indicator (RSSI) and a median frame error rate (FER) of the main AP based on the at least one of the received beacon frame and the received data frame, and outputs a transmission signal with a power level corresponding to the calculated median RSSI and the calculated median FER,
 wherein the sub-AP examines a service set identifier (SSID) of the main AP with reference to the received beacon frame or the received data frame, and
 the sub-AP calculates the median RSSI and the median FER and outputs the transmission signal with the power level corresponding to the calculated median RSSI and the calculated median FER only if, based on the examination, the SSID of the main AP is same as a SSID of the sub-AP.

6. The system of claim 5, wherein the sub-AP comprises:
 a reception unit which receives a beacon frame and a data frame from a main AP;
 a RSSJ checking unit which identifies an RSSI of the main AP with reference to the received beacon frame or the received data frame;
 a FER checking unit which identifies the FER from the received data frame; and
 a control unit which determines a power level at which a transmission signal is to be transmitted based on the identified RSSI and the identified FER and which causes a transmission signal to be output at the determined power level.

7. The system of claim 6, wherein the median RSSI is calculated using the equation:

$$RSSI(i, j) = \text{Median} \left( \sum_{t=1}^{n} \right) RSSI(t))$$

wherein i and j represent a location, and t represents time.

8. The system of claim 6, wherein the median FER is calculated using the equation:

$$FER(i, j) = \text{Median} \left( \sum_{t=1}^{n} \right) FER(t))$$

wherein i and j represent a location, and t represents time.

9. A method of adjusting a power level of a transmission signal of a sub-access point (AP) comprising:
 receiving a data frame transmitted by a main AP;
 examining a service set identifier (SSID) of the main AP with reference to the received data frame; and
 based on the examination, if the SSJD of the main AP is same as a SSID of the sub-AP:
  determining a received signal strength indicator (RSSI) and a frame error rate (FER) of the main AP with reference to the received data frame,
  calculating a median RSSI and a median FER based on the determined RSSI and FER,
  determining a transmission level based on the calculated median RSSI and the calculated median FER, and
  outputting a transmission signal with a power level equivalent to the determined transmission level.

10. The method of claim 9, wherein the determining a transmission level comprises:
 determining whether a transmission level corresponding to the calculated median RSSI is identical to a transmission level corresponding to the calculated median FER; and
 if the transmission level corresponding to the calculated median RS SI is determined not to be identical to the transmission level corresponding to the calculated median FER, choosing the transmission level corresponding to the calculated median RSSI.

11. The method of claim 9, wherein the median RSSI is calculated using the equation:

$$RSSI(i, j) = \text{Median} \left( \sum_{t=1}^{n} \right) RSSI(t))$$

wherein i and j represent a location, and t represents time.

12. The method of claim 9, wherein the median FER is calculated using the equation:

$$FER(i, j) = \text{Median} \left( \sum_{t=1}^{n} \right) FER(t))$$

wherein i and j represent a location, and t represents time.

* * * * *